US007238283B2

United States Patent
Wu et al.

(10) Patent No.: US 7,238,283 B2
(45) Date of Patent: Jul. 3, 2007

(54) SYSTEM FOR WASTEWATER TREATMENT

(75) Inventors: Chung-Ling Wu, Shanhua Township, Tainan County (TW); Chih-Hsiung Chen, Dasi Township, Taoyuan County (TW); I-Shin Tang, Hsin-Chu (TW); Wen-Honh Lee, Hsin-Chu (TW); Chang-Tzong Chen, Taipei (TW); E-Cheng Su, Shanhua Township, Tainan County (TW); Long-Chi Yang, Tainan (TW)

(73) Assignee: Taiwan Semiconductor Manufacturing Co. Ltd., Hsin-Chu (TW)

( * ) Notice: Subject to any disclaimer, the term of this patent is extended or adjusted under 35 U.S.C. 154(b) by 0 days.

(21) Appl. No.: 10/729,033

(22) Filed: Dec. 4, 2003

(65) Prior Publication Data
US 2005/0121394 A1    Jun. 9, 2005

(51) Int. Cl.
*C02F 1/56* (2006.01)
(52) U.S. Cl. .................. 210/199; 210/205; 210/253; 210/257.1; 210/919
(58) Field of Classification Search ............... 210/199, 210/201, 202, 205, 206, 253, 257.1, 258, 210/919, 920
See application file for complete search history.

(56) References Cited

U.S. PATENT DOCUMENTS

| 1,347,823 | A | * | 7/1920 | Peck ........................... 71/25 |
| 2,640,807 | A | * | 6/1953 | Rice ........................... 210/721 |
| 4,724,084 | A | * | 2/1988 | Pahmeier et al. ........... 210/709 |
| 5,106,508 | A | * | 4/1992 | Schwitzgebel .............. 210/712 |
| 5,328,599 | A | * | 7/1994 | Siefert et al. .............. 210/96.1 |
| 6,713,366 | B2 | * | 3/2004 | Mong et al. ................ 438/459 |
| 6,818,131 | B2 | * | 11/2004 | Sha et al. .................... 210/616 |

* cited by examiner

*Primary Examiner*—Peter A. Hruskoci
(74) *Attorney, Agent, or Firm*—Tung & Associates

(57) ABSTRACT

A new and improved wastewater treatment system suitable for the treatment of wastewater from a CMP process. A holding tank receives wastewater from a CMP wastewater collection tank. The holding tank may further receive wastewater from a backside grinding (BG) wastewater collection tank. A reaction tank receives wastewater from the holding tank. A coagulant polymer binds to the slurry particles in the reaction tank to precipitate the slurry particles out of solution. One or a pair of clarifiers receives the wastewater from the reaction tank, and the polymer-bound slurry particles are separated from the wastewater in the clarifier or clarifiers. An effluent collection tank receives the purified wastewater from the clarifier or clarifiers. The purified wastewater may be pumped to a storage tank such as a reused city water (RCW) tank for use in scrubber cleaning processes, for example.

17 Claims, 1 Drawing Sheet

SYSTEM FOR WASTEWATER TREATMENT

FIELD OF THE INVENTION

The present invention relates to chemical mechanical polishers used for polishing semiconductor wafers in the semiconductor fabrication industry. More particularly, the present invention relates to a new and improved system and process suitable for treating CMP or other wastewater in the fabrication of semiconductor integrated circuits.

BACKGROUND OF THE INVENTION

In the fabrication of semiconductor devices from a silicon wafer, a variety of semiconductor processing equipment and tools are utilized. One of these processing tools is used for polishing thin, flat semiconductor wafers to obtain a planarized surface. A planarized surface is highly desirable on a shadow trench isolation (STI) layer, inter-layer dielectric (ILD) or on an inter-metal dielectric (IMD) layer, which are frequently used in memory devices. The planarization process is important since it enables the subsequent use of a high-resolution lithographic process to fabricate the next-level circuit. The accuracy of a high resolution lithographic process can be achieved only when the process is carried out on a substantially flat surface. The planarization process is therefore an important processing step in the fabrication of semiconductor devices.

A global planarization process can be carried out by a technique known as chemical mechanical polishing, or CMP. The process has been widely used on ILD or IMD layers in fabricating modern semiconductor devices. A CMP process is performed by using a rotating platen in combination with a pneumatically-actuated polishing head. The process is used primarily for polishing the front surface or the device surface of a semiconductor wafer for achieving planarization and for preparation of the next level processing. A wafer is frequently planarized one or more times during a fabrication process in order for the top surface of the wafer to be as flat as possible. A wafer can be polished in a CMP apparatus by being placed on a carrier and pressed face down on a polishing pad covered with a slurry of colloidal silica or aluminum.

A CMP process is frequently used in the planarization of an ILD or IMD layer on a semiconductor device. Such layers are typically formed of a dielectric material. A most popular dielectric material for such usage is silicon oxide. In a process for polishing a dielectric layer, the goal is to remove typography and yet maintain good uniformity across the entire wafer. The amount of the dielectric material removed is normally between about 5000 A and about 10,000 A. The uniformity requirement for ILD or IMD polishing is very stringent since non-uniform dielectric films lead to poor lithography and resulting window-etching or plug-formation difficulties. The CMP process has also been applied to polishing metals, for instance, in tungsten plug formation and in embedded structures. A metal polishing process involves a polishing chemistry that is significantly different than that required for oxide polishing.

Important components used in CMP processes include an automated rotating polishing platen and a wafer holder, which both exert a pressure on the wafer and rotate the wafer independently of the platen. The polishing or removal of surface layers is accomplished by a liquid polishing slurry consisting mainly of colloidal silica suspended in deionixed water or KOH solution. The slurry is frequently fed by an automatic slurry feeding system in order to ensure uniform wetting of the polishing pad and proper delivery and recovery of the slurry. For a high-volume wafer fabrication process, automated wafer loading/unloading and a cassette handler are also included in a CMP apparatus.

As the name implies, a CMP process executes a microscopic action of polishing by both chemical and mechanical means. While the exact mechanism for material removal of an oxide layer is not known, it is hypothesized that the surface layer of silicon oxide is removed by a series of chemical reactions which involve the formation of hydrogen bonds with the oxide surface of both the wafer and the slurry particles in a hydrogenation reaction; the formation of hydrogen bonds between the wafer and the slurry; the formation of molecular bonds between the wafer and the slurry; and finally, the breaking of the oxide bond with the wafer or the slurry surface when the slurry particle moves away from the wafer surface. It is generally recognized that the CMP polishing process is not a mechanical abrasion process of slurry against a wafer surface.

While the CMP process provides a number of advantages over the traditional mechanical abrasion type polishing process, a serious drawback for the CMP process is the difficulty in controlling polishing rates at different locations on a wafer surface. Since the polishing rate applied to a wafer surface is generally proportional to the relative rotational velocity of the polishing pad, the polishing rate at a specific point on the wafer surface depends on the distance from the axis of rotation. In other words, the polishing rate obtained at the edge portion of the wafer that is closest to the rotational axis of the polishing pad is less than the polishing rate obtained at the opposite edge of the wafer. Even though this is compensated for by rotating the wafer surface during the polishing process such that a uniform average polishing rate can be obtained, the wafer surface, in general, is exposed to a variable polishing rate during the CMP process.

Recently, a chemical mechanical polishing method has been developed in which the polishing pad is not moved in a rotational manner but instead, in a linear manner. It is therefore named as a linear chemical mechanical polishing process, in which a polishing pad is moved in a linear manner in relation to a rotating wafer surface. The linear polishing method affords a more uniform polishing rate across a wafer surface throughout a planarization process for the removal of a film layer from the surface of a wafer. One added advantage of the linear CMP system is the simpler construction of the apparatus, and this not only reduces the cost of the apparatus but also reduces the floor space required in a clean room environment.

Wastewater from the liquid polishing slurry used in the chemical mechanical polishing process must be properly treated for the removal of copper and other chemicals, as well as slurry particles, from the slurry prior to disposal. A typical conventional wastewater treatment system 10 is shown schematically in FIG. 1. The wastewater treatment system 10 includes a wastewater collection tank 12 which receives wastewater from both a CMP apparatus (not shown) and a Cu-CMP apparatus (not shown). The wastewater is distributed from the collection tank 12, into a holding tank 14 by operation of a set of pumps 16.

A second set of pumps 18 pumps the wastewater from the holding tank 14 into a reaction tank 20. Sodium hydroxide (NaOH) base and sulfuric acid ($H_2SO_4$) may be distributed into the reaction tank 20 in various proportions to achieve a desired pH of the wastewater in the reaction tank 20. Selected quantities of FSC-835 polymer are further distributed into the reaction tank 20, where the FSC-835 polymer is rapidly mixed with the wastewater to bind or coagulate with the slurry chemicals in the wastewater. A reaction tank outlet line 22 distributes the wastewater, with polymer-bound precipitates, from the reaction tank 20 to one or multiple clarifiers 24. EA-630 polymer is introduced into the reaction tank outlet line 22 to bind remaining slurry chemicals in the wastewater before the wastewater enters the clarifiers 24. In the clarifiers 24, the polymer-bound precipitate particles separate out from the wastewater, which is then distributed to an effluent collection tank 26 through a clarifier outlet line 28. In the effluent collection tank 26, further adjustments may be made to the pH of the wastewater. Finally, the wastewater effluent is distributed from the effluent collection tank 26, through an effluent line 30 and into a reused city water (RCW) tank 34, by operation of a set of pumps 32. The wastewater effluent in the RCW tank 34 may be used for inferior water usage, such as, for example, in local scrubber cleaning applications.

While the FSC-835 and EA-630 polymers have been shown to adequately coagulate and precipitate out of solution chemicals in wastewater from slurry used in most chemical mechanical polishing applications, because the wastewater collection tank 12 receives wastewater from both CMP and Cu-CMP processes, excessive quantities of the polymers are necessary to adequately precipitate the high quantities of slurry chemicals in the wastewater. This contributes to unnecessary expense in the wastewater treatment process. Accordingly, a new and improved, more efficient system and process is needed for precipitating slurry chemicals in CMP wastewater for the proper treatment and disposal of the wastewater.

An object of the present invention is to provide a new and improved system for treating wastewater.

Another object of the present invention is to provide a new and improved system which is suitable for the treatment of CMP and Cu-CMP wastewater.

Still another object of the present invention is to provide a new and improved wastewater treatment system which is efficient and economical.

Yet another object of the present invention is to provide a new and improved wastewater treatment system which facilitates the efficient use of coagulant polymers in the coagulation and precipitation of particles in wastewater.

A still further object of the present invention is to provide a new and improved wastewater treatment system which combines backside grinding wastewater and/or backwash treatment wastewater with CMP wastewater to enhance coagulation and precipitation of particles in CMP wastewater.

Yet another object of the present invention is to provide a new and improved wastewater treatment system which is applicable to the treatment of wastewater in a variety of industrial applications and is not limited to use in treating CMP wastewater.

Another object of the present invention is to provide a new and improved method for the treatment of wastewater.

SUMMARY OF THE INVENTION

In accordance with these and other objects and advantages, the present invention generally relates to a new and improved wastewater treatment system which is suitable for the treatment of wastewater from a CMP process. The wastewater treatment system includes a holding tank which receives wastewater from a CMP wastewater collection tank, for example. The holding tank may further receive wastewater from a backside grinding (BG) wastewater collection tank. A reaction tank receives wastewater from the holding tank, and a coagulant polymer binds to the slurry particles in the reaction tank to precipitate the slurry particles out of solution. One or a pair of clarifiers receives the wastewater from the reaction tank, and the polymer-bound slurry particles are separated from the wastewater in the clarifier or clarifiers. An effluent collection tank receives the purified wastewater from the clarifier or clarifiers, and the purified wastewater may be pumped to a storage tank such as a reused city water (RCW) tank for use in scrubber cleaning processes, for example.

In addition to receiving CMP wastewater from the CMP wastewater collection tank and BG (backside grinding) wastewater from the BG wastewater collection tank, the reaction tank may further receive backwash wastewater from a BW (backwash) wastewater collection tank. The coagulant polymer in the reaction tank bridges or cross-links silicon particles in the BG wastewater and the BW wastewater. This significantly accelerates the sedimentation process and expedites separation of the polymer-bound particles from the wastewater in the clarifier or clarifiers, as well as significantly reduces the quantity of coagulant polymer necessary for sedimentation.

The present invention further includes a process for the treatment of wastewater. The method includes providing CMP wastewater in addition to BG wastewater and/or BW wastewater; adding the CMP wastewater to the BG wastewater and/or the BW wastewater to define a combined wastewater; adding a coagulant polymer to the combined wastewater to bind and precipitate the wastewater particles from the wastewater; and separating the polymer-bound wastewater particles from the wastewater.

BRIEF DESCRIPTION OF THE DRAWINGS

The invention will now be described, by way of example, with reference to the accompanying drawings, in which.

DETAILED DESCRIPTION OF THE INVENTION

Figure 1:
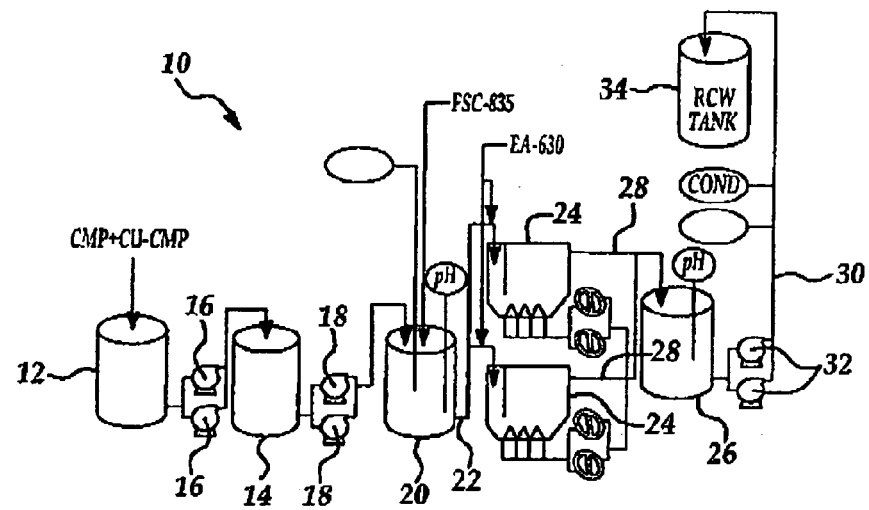
FIG. 1 is a schematic of a typical conventional CMP wastewater treatment system.

The present invention is directed to a new and improved system for the treatment of CMP wastewater produced by a CMP process. However, the invention is not so limited in application, and while references may be made to such CMP wastewater, the invention is more generally applicable to the treatment of wastewater produced by a variety of industrial and mechanical applications.

The present invention contemplates a new and improved wastewater treatment system which is suitable for the treatment of wastewater from a CMP process but may be adapted to treat wastewater resulting from a variety of industrial processes. The wastewater treatment system includes a holding tank which receives wastewater from a CMP wastewater collection tank, for example, and may further receive wastewater from a backside grinding (BG) wastewater collection tank. Wastewater from the holding tank is distributed to a reaction tank, where a coagulant polymer binds to the slurry particles in the reaction tank to precipitate the slurry particles out of solution. The polymer-bound and precipitated particles are physically separated from the wastewater in one or a pair of clarifiers. Wastewater effluent from the clarifiers may be distributed to a storage tank, such as a reused city water (RCW) tank, for use in semiconductor wafer scrubber cleaning applications, for example.

In one embodiment, BW (backwash) wastewater from a BW wastewater collection tank may be distributed into the reaction tank along with the CMP wastewater and BG wastewater. The coagulant polymer in the reaction tank bridges or cross-links silicon and other particles in the BG wastewater and the BW wastewater, forming a flocculation nucleus that attracts additional particles. This nucleation phenomenon significantly accelerates the sedimentation process, both expediting separation of the particles from the wastewater in the clarifier or clarifiers and significantly reducing the quantity of coagulant polymer necessary for sedimentation.

The present invention further contemplates a process for the treatment of wastewater. The method includes providing CMP wastewater in addition to BG wastewater and/or BW wastewater, adding the CMP wastewater to the BG wastewater and/or the BW wastewater to define a combined wastewater, adding at least one coagulant polymer to the wastewater mixture to bind and precipitate the wastewater particles from the wastewater, and separating the polymer-bound wastewater particles from the wastewater effluent.

Compared to the conventional wastewater treatment system and method, the wastewater treatment system and method according to the present invention is effective in removing particles from wastewater while substantially reducing the quantity of coagulant polymer necessary for the purpose. For example, the effective quantity of FSC-835 necessary for complete particle sedimentation has been reduced from 3,600 ppm (3.6 kg/m$^3$) to 800 ppm (0.8 kg/m$^3$). The system and method of the present invention has further been shown to increase the process water reclaim rate from 76.7% to 80.1%.

Figure 2:
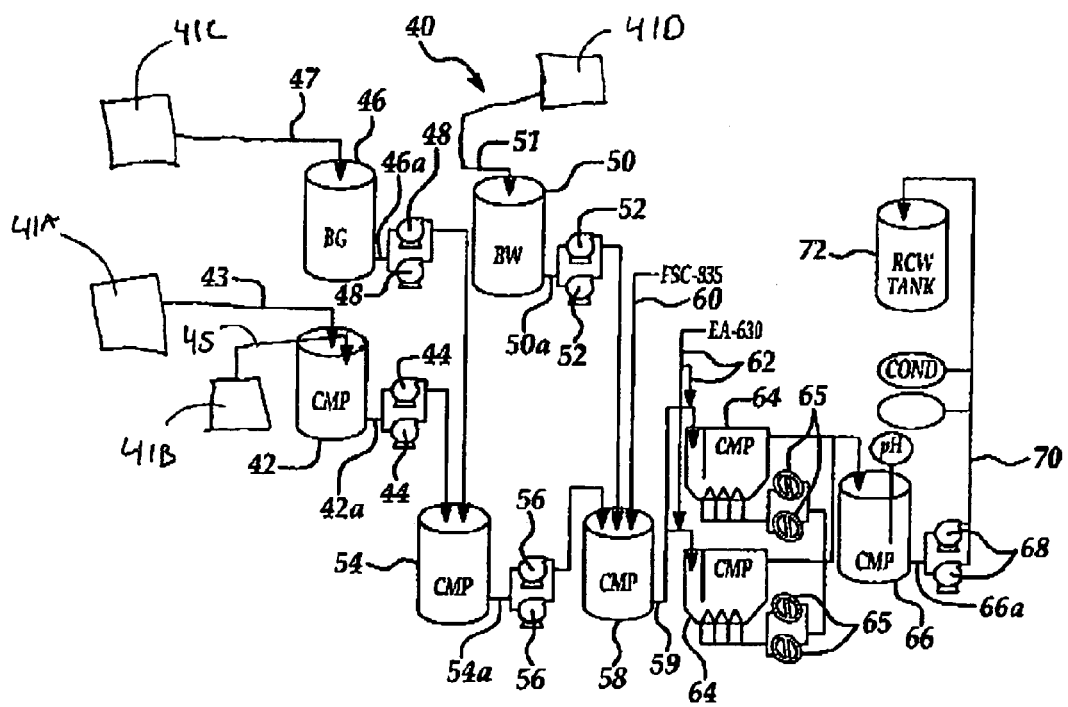
FIG. 2 is a schematic of a wastewater treatment system according to the present invention.

Referring to FIG. 2, an illustrative embodiment of a wastewater treatment system of the present invention is generally indicated by reference numeral 40. The system 40 includes a CMP wastewater collection tank 42 which typically receives raw or untreated CMP wastewater 43 from a CMP apparatus 41A. In a separate treatment process, the CMP wastewater collection tank 42 may receive raw Cu-CMP wastewater 45 produced during a Cu-CMP process from Cu-CMP apparatus 41B. An outlet 42a extends from the CMP wastewater collection tank 42, and one or a pair of pumps 44 is provided in the outlet 42a. A holding tank 54 is provided in fluid communication with the outlet of the pump or pumps 44.

In a semiconductor fabrication process, prior to the dicing and packaging of the individual integrated circuit chips formed on the front side of a wafer (not shown), the wafer is typically ground on the backside to remove unwanted bulk semiconductor material. Accordingly, a BG (backside grind) wastewater collection tank 46, which receives BG wastewater 47 produced during a wafer backgrind process from wafer backgrind apparatus 41A, for example, is typically provided in fluid communication with the holding tank 54 through one or a pair of pumps 48 that are provided in an outlet 46a extending from the BG wastewater collection tank 46.

An outlet 54a extends from the holding tank 54, and one or a pair of pumps 56 is provided in the outlet 54a. The pump or pumps 56 are provided in fluid communication with a reaction tank 58. A backwash wastewater collection tank 50 receives BW (backwash) wastewater 51, typically produced during semiconductor wafer rinsing processes, for example, from wafer rinsing apparatus 41D. An outlet 50a extends from the backwash wastewater collection tank 50, and one or a pair of pumps 52 is provided in the outlet 50a. The pump or pumps 52 are provided in fluid communication with the reaction tank 58.

As hereinafter described, the CMP wastewater 43, along with the BG wastewater 47 and/or the BW wastewater 51, is distributed to the reaction tank 58, where a coagulant polymer 60, such as FSC-835, for example, binds to slurry particles in the wastewater and precipitates the particles out of solution. Chemical adjustments, such as pH adjustments, may also be made to the wastewater in the reaction tank 58. An outlet conduit 59 extends from the reaction tank 58, and a second coagulant polymer 62, such as EA-630, for example, is introduced into the outlet conduit 59, to bind slurry particles which remain unbound to the coagulant polymer 60 in the wastewater.

One or more clarifiers 64 is provided in fluid communication with the outlet conduit 59 of the reaction tank 58. Each of the clarifiers 64 may be fitted with a trap or traps 65 to facilitate the cleaning of sediment from the clarifiers 64. An effluent collection tank 66 is provided in fluid communication with the clarifier or clarifiers 64. An outlet 66a extends from the effluent collection tank 66, and one or a pair of pumps 68 is provided in the outlet 66a. An effluent line 70 extends from the outlet of the pump or pumps 68 and typically discharges into a storage tank 72, which may be a RCW (reused city water) tank.

Referring again to FIG. 2, in typical operation the system 40 is used to treat and remove slurry and other particles from the CMP wastewater 43, the BG wastewater 47 and the backwash wastewater 51. Accordingly, the CMP wastewater 43 is distributed from a CMP apparatus (not shown), into the CMP wastewater collection tank 42; the BG wastewater 47 is distributed from a backside grinding apparatus (not shown), into the BG wastewater collection tank 46; and the BW wastewater 51 is distributed from a wafer rinsing apparatus (not shown), for example, into the backwash wastewater collection tank 50. In a separate treatment process, the Cu-CMP wastewater 45, rather than the CMP wastewater 43, is distributed from a CMP apparatus into the CMP wastewater collection tank 42 for the additional removal of copper particles from the Cu-CMP wastewater 45.

The wastewater treatment process is begun after the CMP wastewater collection tank 42, the BG wastewater collection tank 46 and the BW wastewater collection tank 50 have each been filled with a desired quantity of the corresponding wastewater. In typical operation of the system 40, the total quantity of CMP wastewater 43/Cu-CMP wastewater 45, BG wastewater 47 and BW wastewater 51 in each collection tank is divided into multiple batches, each batch having a selected volume. One batch of wastewater from each of the tanks is typically processed together with the others through the system 40.

A batch of the CMP wastewater 43/Cu-CMP wastewater 45 is distributed from the CMP wastewater collection tank 42 into the holding tank 54, by operation of the pump or pumps 44. A batch of the BG wastewater 47 is distributed from the BG wastewater collection tank 46 to the holding tank 54, by operation of the pump or pumps 48. A batch of the BW wastewater 51 is distributed from the backwash wastewater collection tank 50, to the reaction tank 58, by operation of the pump or pumps 52. Next, by operation of the pump or pumps 56, the CMP wastewater 43/Cu-CMP wastewater 45 and BG wastewater 47 are distributed from the holding tank 54 into the reaction tank 58, where the backwash wastewater 51, from the backwash wastewater collection tank 50, mixes with the CMP wastewater 43/Cu-CMP wastewater 45 and the BG wastewater 47 to form a combined wastewater.

The coagulant polymer 60 is added to the combined wastewater in the reaction tank 58, where the coagulant polymer 60 combines with the silica slurry particles, silicon particles and other particles in the combined wastewater to precipitate or sediment the particles out of solution. Preferably, the coagulant polymer 60 is FSC-835, which is known by those skilled in the art as a potent coagulator of slurry particles in CMP wastewater. It will be appreciated by those skilled in the art that, due to the negative charges on the particles in the wastewater, the positively-charged FSC-835 coagulant polymer 60 bridges or cross-links the wastewater particles, forming micro-floc nuclei which attract additional wastewater particles and form macro-floc coagulant structures. This phenomenon substantially accelerates the wastewater particle sedimentation process in the reaction tank 58, while substantially reducing the quantity of coagulant polymer 60 necessary to effectively remove or precipitate the particles from the wastewater.

The combined wastewater is distributed from the reaction tank 58, through the outlet conduit 59 and into the clarifier or clarifiers 64. In the outlet conduit 59, the coagulant polymer 62 is added to the combined wastewater and combines with any loose particles which remain unbound by the coagulant polymer 60 in the combined wastewater. Preferably, the coagulant polymer 62 is EA-630, which is known by those skilled in the art as a polymer that is effective in the coagulation and precipitation of silica slurry particles from CMP wastewater.

The quantities of the coagulant polymer 60 and coagulant polymer 62 which are effective to adequately bind and precipitate the slurry and other particles out of solution in the combined wastewater can be determined using a wastewater sample jar test, for example. In such a test, about selected volumes each of the CMP wastewater 43/Cu-CMP wastewater 45, BG wastewater 47 and BW wastewater 50 are mixed together at various ratios in a glass jar (not shown). Selected quantities of the coagulant polymer 60 and coagulant polymer 62 are then added to the combined wastewater to determine the dosage necessary to facilitate optimal sedimentation and precipitation of the particles out of solution in the wastewater. The pH and turbidity of the combined wastewater are measured to determine the optimum pH values needed for effective sedimentation. In typical application, the FSC-835 is added to the wastewater in the reaction tank 58 in selected quantities, whereas the EA-630 is added to the wastewater in the outlet conduit 59 in selected quantities. The optimum pH for the combined wastewater in the reaction tank 58 is typically adjusted to achieve optimal sedimentation and precipitation.

In the clarifier or clarifiers 64, the polymer-bound particles which precipitated out of solution in the combined wastewater in the reaction tank 58 and outlet conduit 59 are physically separated from the wastewater. The purified wastewater effluent is then distributed from the clarifier or clarifiers 64 and typically into an effluent collection tank 66. Sodium hydroxide (NaOH) base and sulfuric acid ($H_2SO_4$) may be distributed into the effluent collection tank 66, in various proportions, to achieve a desired pH of the wastewater in the effluent collection tank 66.

From the effluent collection tank 66, the wastewater effluent is distributed, typically by operation of the pump or pumps 68, through an effluent line 70 and into the storage tank 72. The treated and purified wastewater treatment in the storage tank 72 can be used for inferior water usage, such as in local scrubber cleaning applications, for example.

While the preferred embodiments of the invention have been described above, it will be recognized and understood that various modifications can be made in the invention and the appended claims are intended to cover all such modifications which may fall within the spirit and scope of the invention.

What is claimed is:

1. A system for batch treating semiconductor manufacturing process wastewater, comprising:
    a first collection tank in fluid communication with a wafer backgrind apparatus for receiving a first wastewater comprising first particles;
    a second collection tank in fluid communication with a planarization apparatus for receiving a second wastewater comprising second particles;
    a batch reaction tank provided in fluid communication with said first collection tank and said second collection tank, said batch reaction tank for receiving and sedimenting particles from a batch of wastewater comprising the first wastewater and the second wastewater wherein said reaction tank is configured to add a polymer coagulant to said batch to form a precipitate comprising said first and second particles for sedimentation; and
    at least one clarifier provided in fluid communication with said batch reaction tank for separating said precipitate from said batch of wastewater.

2. The system of claim 1 further comprising a holding tank provided in fluid communication with said first collection tank, said second collection tank and said reaction tank for receiving the first wastewater and the second wastewater from said first collection tank and said second collection tank, respectively, and distributing the first wastewater and the second wastewater to said reaction tank.

3. The system of claim 1 further comprising an effluent collection tank provided in fluid communication with said at least one clarifier for receiving wastewater effluent from said at least one clarifier.

4. The system of claim 3 further comprising a holding tank provided in fluid communication with said first collection tank, said second collection tank and said reaction tank for receiving the first wastewater and the second wastewater from said first collection tank and said second collection tank, respectively, and distributing the first wastewater and the second wastewater to said reaction tank.

5. The system of claim 1 further comprising a third collection tank for receiving a third wastewater and wherein said reaction tank is provided in fluid communication with said third collection tank for receiving the third wastewater.

6. The system of claim 5 further comprising a holding tank provided in fluid communication with said first collection tank, said second collection tank and said reaction tank for receiving the first wastewater and the second wastewater from said first collection tank and said second collection tank, respectively, and distributing the first wastewater and the second wastewater to said reaction tank.

7. The system of claim 5 further comprising an effluent collection tank provided in fluid communication with said at least one clarifier for receiving wastewater effluent from said at least one clarifier.

8. The system of claim 7 further comprising a holding tank provided in fluid communication with said first collection tank, said second collection tank and said reaction tank for receiving the first wastewater and the second wastewater from said first collection tank and said second collection tank, respectively, and distributing the first wastewater and the second wastewater to said reaction tank.

9. A system for batch treating semiconductor manufacturing process wastewater, comprising:

a first collection tank in fluid communication with a wafer backgrind apparatus for receiving a first wastewater comprising first particles;

a second collection tank in fluid communication with a planarization apparatus for receiving a second wastewater comprising second particles;

a batch reaction tank provided in fluid communication with said first collection tank and said second collection, said batch reaction tank for receiving and sedimenting particles from a batch of wastewater comprising the first wastewater and the second wastewater, said reaction tank further configured for adding a polymer coagulant to form a precipitate comprising said first and second particles;

at least one clarifier provided in fluid communication with said batch reaction tank for separating the precipitate from the batch of wastewater wherein said fluid communication comprises an outlet portion of said reaction tank, said outlet portion configured for adding a second additive to further form said precipitate; and a storage tank provided in fluid communication with said at least one clarifier for receiving wastewater effluent from said at least one clarifier.

10. The system of claim 9 further comprising a holding tank provided in fluid communication with said first collection tank, said second collection tank and said reaction tank for receiving the first wastewater and the second wastewater from said first collection tank and said second collection tank, respectively, and distributing the first wastewater and the second wastewater to said reaction tank.

11. The system of claim 9 further comprising an effluent collection tank provided in fluid communication with said at least one clarifier for receiving wastewater effluent from said at least one clarifier, and wherein said storage tank is provided in fluid communication with said effluent collection tank.

12. The system of claim 11 further comprising a holding tank provided in fluid communication with said first collection tank, said second collection tank and said reaction tank for receiving the first wastewater and the second wastewater from said first collection tank and said second collection tank, respectively, and distributing the first wastewater and the second wastewater to said reaction tank.

13. The system of claim 9 further comprising a third collection tank for receiving a third wastewater and wherein said reaction tank is provided in fluid communication with said third collection tank for receiving the third wastewater.

14. The system of claim 13 further comprising a holding tank provided in fluid communication with said first collection tank, said second collection tank and said reaction tank for receiving the first wastewater and the second wastewater from said first collection tank and said second collection tank, respectively, and distributing the first wastewater and the second wastewater to said reaction tank.

15. The system of claim 13 further comprising an effluent collection tank provided in fluid communication with said at least one clarifier for receiving wastewater effluent from said at least one clarifier, and wherein said storage tank is provided in fluid communication with said effluent collection tank.

16. The system of claim 15 further comprising a holding tank provided in fluid communication with said first collection tank, said second collection tank and said reaction tank for receiving the first wastewater and the second wastewater from said first collection tank and said second collection tank, respectively, and distributing the first wastewater and the second wastewater to said reaction tank.

17. A system for batch treating semiconductor manufacturing process wastewater amount of polymer coagulant to form a precipitate, comprising:

a first collection tank in fluid communication with a wafer backgrind apparatus for receiving a first wastewater comprising first particles;

a second collection tank in fluid communication with a planarization apparatus for receiving a second wastewater comprising second particles;

a third collection tank in fluid communication with a wafer rinsing apparatus for receiving a third wastewater;

a batch reaction tank provided in fluid communication with said first, second and third collection tanks, said batch reaction tank for receiving and sedimenting particles from a batch of wastewater comprising the first, second and third wastewaters wherein said batch reaction tank is configured for receiving a polymer coagulant to form a precipitate comprising said first and second particles for sedimentation;

wherein said batch reaction tank comprises an outlet portion, whereby said outlet portion is configured for receiving said polymer coagulant to further form said precipitate; and, at least one clarifier provided in fluid communication with said batch reaction tank for separating said precipitate from said batch of wastewater.

* * * * *